Nov. 19, 1968    K. J. GARRETT    3,411,562
TEMPORARY WINDSHIELD
Filed July 8, 1966    2 Sheets-Sheet 1
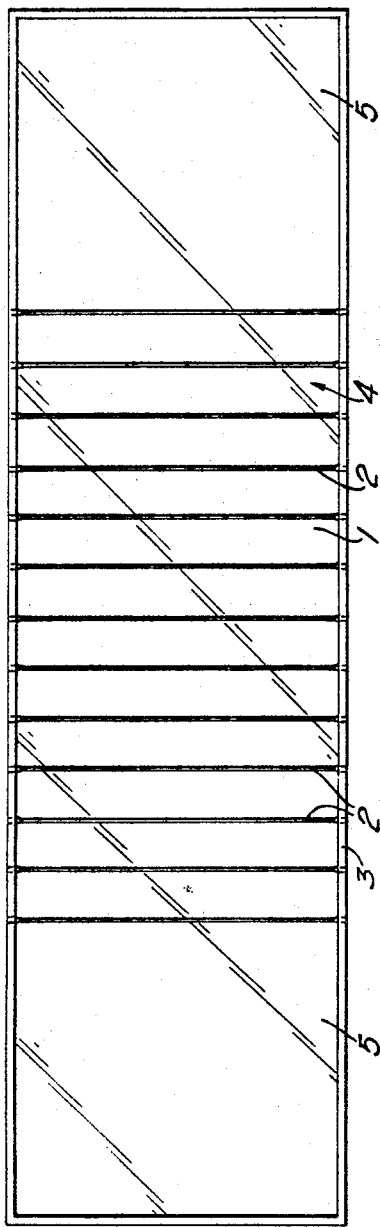
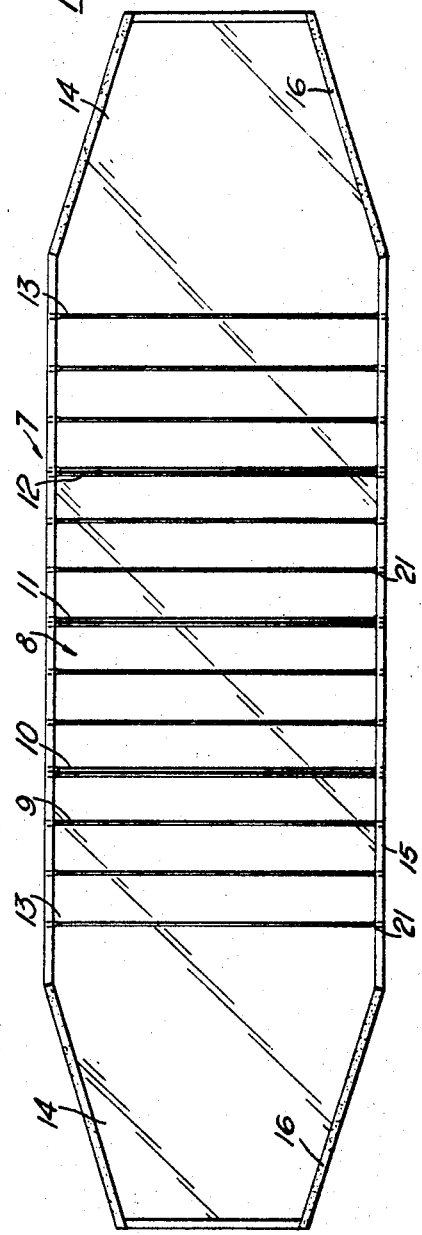
Inventor
Kenneth John Garrett
By
Cushman, Darby & Cushman
Attorneys Nov. 19, 1968  K. J. GARRETT  3,411,562

TEMPORARY WINDSHIELD

Filed July 8, 1966  2 Sheets-Sheet 2

Inventor
Kenneth John Garrett
By
Cushman, Darby & Cushman
Attorneys

3,411,562
TEMPORARY WINDSHIELD
Kenneth John Garrett, Chartridge, Chesham, England, assignor to Humphrey Thompson Enterprises Limited, Middlesex, England, a British company
Filed July 8, 1966, Ser. No. 563,851
Claims priority, application Great Britain, July 19, 1965, 30,655/65
3 Claims. (Cl. 160—327)

ABSTRACT OF THE DISCLOSURE

A temporary windshield for a motor vehicle, the permanent windshield of which has been broken. The temporary windshield includes a sheet of transparent plastic material which can be rolled up for convenient transport in the trunk of a vehicle, the sheet having a series of parallel transfer aluminium reinforcing rods to support the plastic sheet over the opening within the windshield frame.

---

The present invention relates to temporary windscreens or windshields for use in automobiles, lorries, etc.

It is an extremely common occurence for the windscreen of a motor car, lorry, etc., to become broken during the course of a journey, this breaking being caused by the throwing up of stones by the wheels of other vehicles, by violent temperature changes, or by undue stresses applied to the windscreen frame arising from twisting of the chassis over uneven road surfaces. When the windscreen becomes broken, if it is formed from safety glass, it shatters and forms a complete mosaic of tiny pieces of glass, which render it practically opaque. Therefore a driver has to punch or knock a hole in the shattered windscreen to enable him to drive any further. When this has happened the driver either has a very restricted field of view or else he is without a windscreen and tends to suffer a severe wind in his face, and, if it is raining, to get extremely wet.

According to the present invention there is provided a temporary windscreen comprising an elongate sheet of flexible transparent plastics material, reinforced by a plurality of transversely extending reinforcing rods, means being provided for securing the sheet to a vehicle in a position to extend over the windscreen.

With the screen of the present invention, it is possible to make a sufficiently large hole, or indeed completely to remove the shattered windscreen, so that the driver has a wide field of vision and is completely protected from the elements.

The plastics material used may be any suitable transparent material which is of a suffiicently robust nature to prevent it from splitting, yet is sufficiently pliable or flexible to enable it to be rolled up when not in use. A suitable plastics material is that sold under the trademark "Melinex" as manufactured by the Imperial Chemical Industries. The reinforcing rods are preferably formed of a light alloy and are secured to the transparent plastics sheet by a waterproof binding tape folded over the top and bottom edges of the sheet, so that the rods extend parallel to one another. The reinforcing rods may be of a generally circular cross-secion, except that the ends thereof, may be flattened to facilitate the securing by the binding tape. In a preferred econstruction reinforcing rods are perpendicular to the length of the sheet, whereby they extend substantially vertically in use.

The means for securing the sheet to the car may comprise clips such as those known under the trade name "fold flat." However, in a preferred construction, the ends of the sheet are tapered to provide flaps of trapezium form beyond the endmost reinforcing rods, and at least those portions of the top and bottom edges of the sheet beyond the endmost reinforcing rods are provided with strips of compressible material. The compressible material may be of any suitable form, for example they may be strips of a foam material, for example polyurethane or polystyrene foam material.

According to a further aspect of the present invention there is provided a packaged article comprising a windscreen according to the invention, rolled up into cylindrical form about an axis transverse to the length of the sheet, a pair of circular end caps being fitted over the ends of the roll, each end cap having an annular peripheral flange within which the ends of the rods are positioned, the thus formed package being hermetically sealed in a tube of plastics material film.

In order that the present invention may more readily be understood, the following description is given, merely by way of example, reference being made to the accompanying drawings in which:

FIGURE 1 is a front elevation of a first embodiment of windscreen according to the present invention;

FIGURE 2 is a view similar to FIGURE 1 of a second embodiment;

Figure 3:
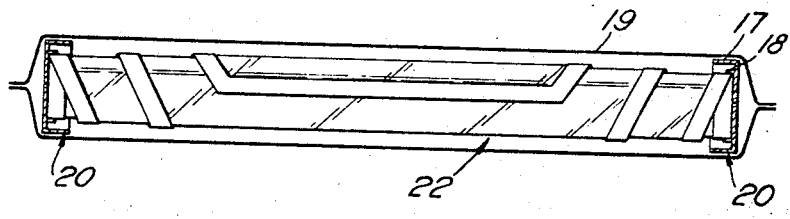
FIGURE 3 is a side elevation of the windscreen of FIGURE 2 in the rolled up condition to form a packaged article.

Referring to the drawings, there is illustrated therein a sheet of transparent plastics material 1, as sold by the Imperial Chemical Industries, under the trademark "Melinex," having secured to it a plurality of transversely extending stiffening rods 2, made from a suitable alloy. The rods 2 are secured to the sheet 1 by means of a waterproof binding tape 3, which also serves to form a border for the screen.

In the embodiment illustrated, thirteen reinforcing rods 2 are secured parallel to one another and perpendicular to the length of the screen, 3 inches (7.6 cm.) apart in the central zone 4 of the sheet of "Melinex" measuring 5 ft. 6 ins. x 18 ins. (167.6 cm. x 45.7 cm.). Thus, an unbraced portion 5 at each end of about 15 ins. (38.1 cm.) in length is left, the tape being used in this embodiment being 1 in. (2.5 cm.) in width.

In order to secure the screen to the car, the screen is placed with the rods innermost against the frame of the windscreen and any of the shattered windscreen which still remains, and the unbraced end portions 5 are clipped to the rain gutter of the car on either side of the glass windscreen frame by means of spring clips such as those sold under the trade name "Fold Flat."

In the embodiment illustrated in FIGURE 2 of the drawings, the screen is designed for the "wrap-around" form of windscreen currently used in modern motor cars. In this embodiment the central portion 8 of the "Melinex" screen 7 is 20 ins. (50.8 cm.) high and the whole screen measures 5 ft. 6 ins. (167.6 cm.) in length. Once again thirteen reinforcements 9 are used extending in a direction perpendicular to the length of the screen. However, the fourth, seventh and tenth reinforcement 10, 11, 12 from each end are provided with double rods for greater supporting rigidity.

The ends of the sheet are tapered to provide flaps 14 of trapezium form beyond the endmost reinforcing rods 13. The whole screen, including the flaps is provided with a waterproof binding tape 15 which also serves to secure the reinforcing rods in position. The rods are of circular cross-section, except for the end portions 21, which are of flattened cross-section to facilitate securing by the binding tape. The sloping sides of the trapezium form flaps 14 are provided with strips 16 of polyurethane or polystyrene foam material.

In use of the screen of FIGURE 2 the screen is again placed with the rods 9–12 innermost against the frame of the glass windscreen and any of the shattered windscreen which still remains, and the flaps 14 are pulled into the interior of the car through the door opening. The doors are then shut thus compressing the strips 16 of foam material. This simple expedient serves to hold the screen rigidly in place on the front of the vehicle.

In a test using such a windscreen on a motor car which had had the glass windscreen completely removed, it was found that the windscreen of the present invention was perfectly stable at a car speed of 70 miles per hour and was substantially waterproof in very heavy rain. It was also found that in heavy rain, the windscreen wipers worked perfectly satisfactory on the outside of the transparent plastics sheet.

The screen of the present invention is of an extremely flexible nature and can readily be rolled up for stowing in the boot of a car or other vehicle. In the examples referred to above of the windscreen according to the invention, it was found that the screen could be rolled into a cylinder 22 of 18 ins. (45.7 cm.) or 20 ins. (50.8 cm.) in length and less than 2 ins. (5.1 cm.) in diameter.

Figure 4:
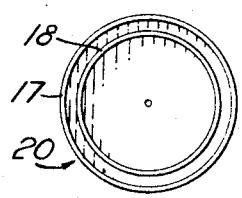
FIGURE 4 is a front elevation of an end cap used in the package of FIGURE 3.

As can be seen from FIGURE 3 of the drawings, the windscreen of FIGURE 2 is rolled up. Before rolling, a thin sheet of polyethylene film is positioned over the reinforcing rods 9–12 to prevent any scratching of the plastics material of the temporary windscreen itself. After rolling up of the screen with the reinforcing rods 9–12 on the inside end caps 20 as illustrated in FIGURE 4 can be placed on the ends of the roll. These end caps 20 are provided with a peripheral annular flange 17 and a further concentric flange 18 of less height than the peripheral flange. The ends of the reinforcing rods 9–12 locate within the peripheral flange 17 and the screen is held in the rolled up condition thereby. A polyethylene film tube 19 is then slipped over the thus formed assembly and the ends of the tube are hermetically sealed.

By this means the windscreen may be kept for a prolonged period in the boot of a car or other vehicle, without incurring any damage to it, so that it can be used as and when required.

I claim:

1. A temporary replacement windshield comprising in combination:
   (i) an elongate sheet of flexible transparent plastics material;
   (ii) top, bottom and two side edges to said sheet;
   (iii) a front and rear face to said sheet;
   (iv) a central portion and end flaps to said sheets;
   (v) a plurality of transversely extending reinforcing rods located in closely spaced apart parallel relationship, transversely of said central portion and secured on the rear face of said central zone; and
   (vi) strips of compressible foam material on at least those portions of the top and bottom edges of the sheet included in said flap portions, effective to permit said flap portions to be gripped between a vehicle door and doorpost to retain the windshield in position.

2. The temporary replacement windshield specified in claim 1, wherein said reinforcing rods are formed of a light alloy, wherein said reinforcing rods include end portions wherein said reinforcing rods are secured by waterproof binding tape folded over said top and bottom edges of said sheet and said end portion, and wherein said binding tape is also folded over said side edges of said sheet.

3. A packaged article comprising in combination:
   (a) a temporary windshield comprising:
       (aa) an elongate sheet of flexible transparent plastics material;
       (bb) top, bottom and two side edges to said sheet;
       (cc) a plurality of transversely extending reinforcing rods secured to one face of said sheet;
       (dd) ends to said rods;
   (b) said windshield rolled-up into a cylindrical roll parallel to an axis transverse to the length of said sheet;
   (c) a pair of circular end caps fitted over the ends of said roll;
   (d) an annular peripheral flange on each said end cap, said ends of said rods being located within said peripheral flange; and
   (e) a tube of plastics material heat sealed on the thus formed package.

References Cited
UNITED STATES PATENTS

| | | |
|---|---|---|
| 481,465 | 8/1892 | Bingham et al. |
| 2,371,430 | 3/1945 | De Patto _____ 296—90 X |
| 2,506,108 | 5/1950 | Riemann et al. |
| 2,599,066 | 6/1952 | Osborn. |
| 2,624,406 | 11/1953 | Szychowski. |
| 2,851,303 | 9/1958 | McQueen. |
| 3,140,115 | 7/1964 | Bliss. |
| 3,266,560 | 8/1966 | Mooskian. |
| 3,270,791 | 9/1966 | Harris. |

FOREIGN PATENTS

| | | |
|---|---|---|
| 1,042,510 | 6/1953 | France. |

DAVID J. WILLIAMOWSKY, *Primary Examiner.*

P. C. KANNAN, *Assistant Examiner.*